(12) United States Patent
Chen et al.

(10) Patent No.: US 11,789,936 B2
(45) Date of Patent: Oct. 17, 2023

(54) STORAGE ENGINE FOR HYBRID DATA PROCESSING

(71) Applicant: LEMON INC., Grand Cayman (KY)

(72) Inventors: Jianjun Chen, Los Angeles, CA (US); Yonghua Ding, Los Angeles, CA (US); Ye Liu, Los Angeles, CA (US); Fangshi Li, Los Angeles, CA (US); Li Zhang, Los Angeles, CA (US); Mingyi Zhang, Los Angeles, CA (US); Kui Wei, Los Angeles, CA (US); Wei Ding, Los Angeles, CA (US); Kai Wu, Los Angeles, CA (US); Jason Yang Sun, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 116 days.

(21) Appl. No.: 17/462,853

(22) Filed: Aug. 31, 2021

(65) Prior Publication Data

US 2023/0063730 A1    Mar. 2, 2023

(51) Int. Cl.
   *G06F 16/00*   (2019.01)
   *G06F 16/23*   (2019.01)
   *G06F 16/28*   (2019.01)

(52) U.S. Cl.
   CPC .......... *G06F 16/2379* (2019.01); *G06F 16/28* (2019.01)

(58) Field of Classification Search
   CPC .............................. G06F 16/2379; G06F 16/28
   USPC ....................................................... 707/607
   See application file for complete search history.

(56) References Cited

U.S. PATENT DOCUMENTS

| | | | |
|---|---|---|---|
| 7,620,660 B2 | 11/2009 | Kodavalla et al. | |
| 10,002,175 B2 | 6/2018 | Kemper et al. | |
| 2011/0178984 A1* | 7/2011 | Talius | G06F 16/27 707/634 |
| 2013/0073513 A1 | 3/2013 | Kemper et al. | |
| 2014/0052743 A1* | 2/2014 | Schauer | G06F 16/2455 707/754 |
| 2014/0279900 A1 | 9/2014 | Gupta et al. | |

(Continued)

FOREIGN PATENT DOCUMENTS

| | | |
|---|---|---|
| CN | 111858759 A | 10/2020 |
| CN | 112363873 A | 2/2021 |
| CN | 111858759 B | 6/2021 |

OTHER PUBLICATIONS

International Patent Application No. PCT/SG2022/050540; Int'l Search Report; dated Mar. 12, 2023; 5 pages.

(Continued)

*Primary Examiner* — Vincent F Boccio
(74) *Attorney, Agent, or Firm* — BakerHostetler

(57) ABSTRACT

The present disclosure describes storage techniques for hybrid transactional and analytical processing. Data captured by a first processing engine may be received. The first processing engine may be configured to perform online transactional processing). Multiple replicas of logical logs generated based on the data may be distributed to a Delta Store by applying a quorum protocol on the multiple replicas. Data in the Delta Store are stored in a row format and are visible to a query for online analytical processing performed by a second processing engine. Data may be flushed from the Delta Store to a Base Store based on one or more predetermined rules. Data in the Base Store are stored in a columnar format and may be accessible by the second processing engine.

20 Claims, 11 Drawing Sheets

(56) References Cited

U.S. PATENT DOCUMENTS

| | | | |
|---|---|---|---|
| 2016/0103877 A1* | 4/2016 | Ozcan | G06F 16/24532 707/714 |
| 2016/0224253 A1* | 8/2016 | Tuers | G06F 3/0688 |
| 2016/0248866 A1 | 8/2016 | Garas | |
| 2017/0011012 A1 | 1/2017 | Das et al. | |
| 2017/0366624 A1 | 12/2017 | Tsang et al. | |
| 2018/0150490 A1* | 5/2018 | Lipcon | G06F 16/2282 |
| 2018/0196694 A1 | 7/2018 | Banerjee et al. | |
| 2019/0325055 A1 | 10/2019 | Lee et al. | |
| 2021/0081403 A1* | 3/2021 | Tian | G06F 16/2379 |
| 2021/0357407 A1 | 11/2021 | Bok et al. | |
| 2021/0365469 A1 | 11/2021 | Brunswig et al. | |

OTHER PUBLICATIONS

Huang et al.; "TiDB: A Raftbased HTAP Database"; Proceedings of the VLDB Endowment; vol. 13 No. 12; Sep. 2020; p. 3072-3084.

Lee et al.; "SAP HANA Distributed In-Memory Database System: Transaction, Session, and Metadata Management"; $29^{th}$ IEEE Int'l Conf. on Data Engineering; Dec. 2013; 9 pages.

Lee et al.; "Parallel Replication across Formats in SAP HANA for Scaling Out Mixed OLTP/OLAP Workloads"; Proceedings of the VLDB Endowment; vol. 10 No. 12; Aug. 2017; p. 1598-1609.

International Patent Application No. PCT/SG2022/050550; Int'l Search Report; dated Apr. 24, 2023; 3 pages.

Lang et al.; "Data Blocks: Hybrid OLTP and OLAP on Compressed Storage using both Vectorization and Compilation"; Int'l Conf. on Management of Data SIGMOD; 2016; p. 311-326.

International Patent Application No. PCT/SG2022/050549; Int'l Search Report; dated Mar. 13, 2023; 5 pages.

Muhlbauer et al.; "ScyPer: Elastic OLAP Throughput on Transactional Data"; Proceedings of the Second Workshop on Data Analytics in the Cloud; Jun. 2013; p. 11-15.

Chen et al.; "ByteHTAP: ByteDance's HTAP System with High Data Freshness and Strong Data Consistency"; Proceedings of the VLDB Endowment; vol. 15 No. 12; Aug. 2022; p. 3411-3424.

Kolodner et al.; "Atomic Incremental Garbage Collection and Recovery for a Large Stable Heap"; ACM SIGMOD; Jun. 1993; p. 177-186.

Ahn et al.; "Designing an Efficient Replicated Log Store with Consensus Protocol"; $11^{th}$ USENIX Conf. on Hot Topics in Cloud Computing; 2019; 7 pages.

\* cited by examiner

| 502 | 504 | 506 | 508 | 510 | |
|---|---|---|---|---|---|
| Partition Key = 1024 | Table = b | OP = Del | LSN = 100 | Primary Key = 1 | NULL |
| Partition Key = 1024 | Table = b | OP = Insert | LSN = 100 | Primary Key = 1 | Values |
| Partition Key = 1024 | Table = b | OP = Del | LSN = 101 | Primary Key = 2 | NULL |
| Partition Key = 1024 | Table = b | OP = Insert | LSN = 102 | Primary Key = 3 | Values |
| Partition Key = 1024 | Table = b | OP = Insert | LSN = 103 | Primary Key = 5 | Values |
| Partition Key = 1024 | Table = b | OP = Del | LSN = 104 | Primary Key = 7 | NULL |
| Partition Key = 1024 | Table = b | OP = Del | LSN = 104 | Primary Key = 1 | NULL |
| Partition Key = 1024 | Table = a | OP = DDL | LSN = 105 | | Create table, columns, types |

FIG. 5

800

Receiving data captured by a first processing engine in real time, wherein the first processing engine is configured to perform online transactional processing (OLTP) 802

Distributing multiple replicas of logical logs generated based on the data to a Delta Store by applying a quorum protocol on the multiple replicas, wherein data in the Delta Store are stored in a row format and visible to a query for online analytical processing (OLAP) performed by a second processing engine 804

Flushing data from the Delta Store to a Base Store based on one or more predetermined rules, wherein data in the Base Store are stored in a columnar format and accessible by the second processing engine 806

Receiving data captured by a first processing engine in real time, wherein the first processing engine is configured to perform online transactional processing (OLTP) 902

Distributing multiple replicas of logical logs generated based on the data to a Delta Store by applying a quorum protocol on the multiple replicas, wherein data in the Delta Store are stored in a row format 904

Updating the data in the Delta Store by performing a delete operation and an insert operation 906

Managing the Delta Store using a vector of arenas, wherein the vector comprises an initial arena with a configurable starting size, and a new arena with a larger size is added to the vector when the Delta Store uses up a memory in the initial arena 908

FIG. 9

STORAGE ENGINE FOR HYBRID DATA PROCESSING

BACKGROUND

Data processing refers to the process of performing specific operations on a set of data or a database. A database is an organized collection of facts and information, such as records on inventory, customers, and so on. Numerous forms of data processing exist and serve diverse applications in the business setting. As databases are increasingly used to store large amounts of complex data, improvements in data processing and storage may be desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows an example logical log.

FIG. 8 shows example process of a storage engine for hybrid transactional and analytical processing.

FIG. 9 shows example process of a storage engine for hybrid transactional and analytical processing.

DETAILED DESCRIPTION OF ILLUSTRATIVE EMBODIMENTS

Figure 1:
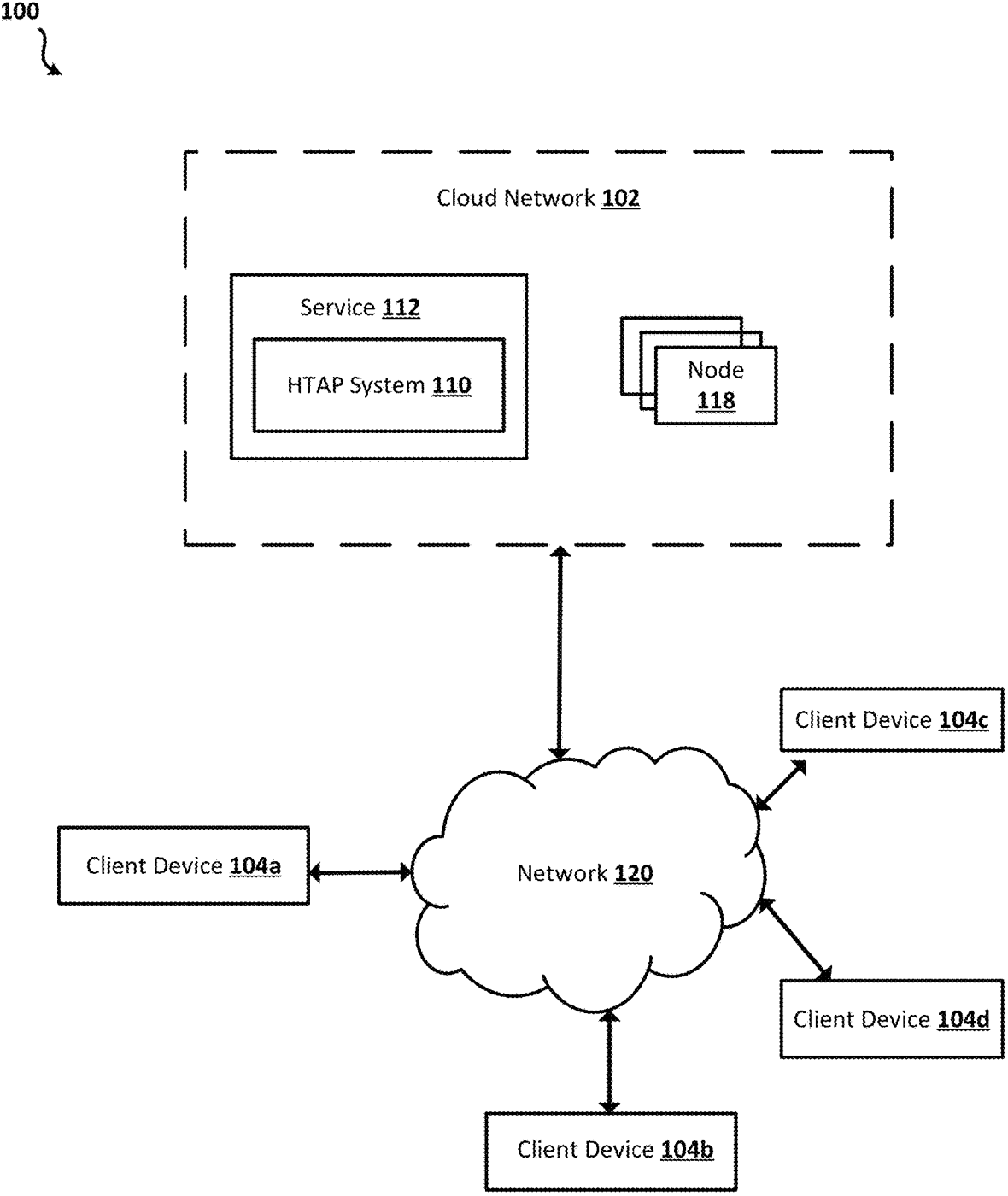
FIG. 1 shows an example system including a cloud service.

Online analytical processing (OLAP) systems enable users to analyze multidimensional data interactively from multiple perspectives. Multidimensional data includes data sets with three or more dimensions. OLAP systems allow users to analyze information from multiple database systems at the same time. OLAP systems enables analysts to extract and view data, such as business data, from different points of view. Analysts frequently need to group, aggregate, and join data. These OLAP operations in data mining are resource intensive. With OLAP, data can be pre-calculated and pre-aggregated, making analysis faster. However, traditionally OLAP systems typically bulk load large amounts of data periodically. This may cause OLAP systems to suffer from the problem of stale data.

OLAP is typically contrasted to OLTP (online transaction processing) systems. OLTP systems capture, store, and process data from transactions. OLTP systems are generally characterized by less complex queries, in a larger volume, to process transactions rather than for the purpose of business intelligence or reporting. Traditional OLTP systems are able to support data manipulation language (DML). DML is a computer programming language used for adding (inserting), deleting, and modifying (updating) data in a database. Traditional OLTP systems may also be able to support point look-up queries efficiently.

Noticeable differences exist between OLAP systems and OLTP systems. For example, OLTP systems typically do not have massive parallel query engines (such as those present in OLAP systems) to support efficient complex query processing over large amount of data. As another example, OLAP systems are mostly optimized for read only and may not support other kinds of queries, whereas OLTP systems process all kinds of queries (read, insert, update, and delete). As yet another example, OLTP systems are associated with short atomic transactions, whereas OLAP systems allow for more flexible distribution patterns and higher scalability, but with increased latency and without guaranteed upper bound to processing time.

Many prevailing data platforms/systems focus on only one of these workloads (e.g., either OLAP or OLTP). However, many scenarios (e.g., business scenarios) require both the performance of complex OLAP-like analysis over freshly imported data and the transaction support and strong data consistencies offered by OLTP systems. Traditionally, in data warehousing, data is extracted from an OLTP system, and is then transformed and loaded into an OLAP system during an Extract-Transform-Load (ETL) process. The ETL process introduces a long delay (e.g., tens of minutes to hours) between the transaction and data visibility to the OLAP system.

Hybrid transaction/analytical processing (HTAP) systems are most suitable for such scenarios. HTAP systems are desirable for business scenarios that require performing complex OLAP-like analysis over freshly imported data. In addition, HTAP systems are desirable to customers that want transaction support and high data freshness in analytic processing. HTAP systems offers several unique advantages. In a HTAP system, OLAP and OLTP workloads are united within a single system. By uniting OLAP and OLTP workloads within a single system, the complexity and cost for deployment and maintenance are significantly reduced. Such a versatile system can significantly reduce staleness in the query results (such staleness is usually introduced by the time-consuming and costly ETL process from operational databases to data warehouses). Such a system also has the capability for complex analysis over real-time data, thus addressing modern business models that usually require an effective response to transient opportunities that must be exploited in real-time.

However, many existing HTAP systems have downsides. Many existing HTAP systems apply offline ETL to ingest data into columnar file formats. This offline ETL process tends to suffer from high lag times between the OLTP data and the OLAP copy. Some other HTAP systems maintain row format data for the OLTP system and columnar format data for the OLAP system in one system. However, such HTAP systems may not have high data freshness or may not have the techniques for efficient analytic processing in the HTAP storage engine. Accordingly, a HTAP system that addresses these shortcomings is desirable.

A HTAP system that is able to handle business scenarios with both transactional (OLTP) workloads and complex analytical (OLAP) workloads is described herein. Unlike existing HTAP systems, the HTAP system described herein utilizes a large-scale, real-time analytics architecture that facilitates fresh data changes and strong data consistency. The improved HTAP system is configured to handle fast DML (Data Manipulation Language) query processing over row store in the OLTP engine. The improved HTAP system is further configured to handle distributed query processing efficiently for complex OLAP queries, including Join and Aggregate operations, in the OLAP engine. Data changes from the OLTP engine are continuously applied to an in-memory distributed Delta Store, and the improved HTAP system allows the OLAP engine to query up to date OLTP data changes immediately (or almost immediately).

The HTAP system described herein comprises a storage engine. The storage engine may be decouplable from the OLAP engine and/or the OLTP engine. Due to the architecture of separated compute engine(s) and storage engine, the HTAP storage engine may be configured to support efficient analytic processing and high data freshness. High data freshness may indicate that the transactional data from the OLTP database is visible to the OLAP database immediately or almost immediately. Many features of the HTAP system described here contribute to efficient analytic processing and high data freshness, including but not limited to, concurrent log apply to in-memory Delta Stores, predicate/aggregate pushdown to the storage engine, efficient columnar Base Store for analytical query processing, cost-based optimization on delete filtering, efficient memory management and garbage collection using a vector of arenas, background flush/groom, etc.

The improved HTAP system may feature a flexible modularized design. The major components of the system (such as the OLTP query engine, OLAP query engine and/or the underlying storage) are modularized and decouplable. As a result, the components can be easily changed without the hassle of modifying the whole architecture. For example, the HTAP storage engine may be decoupled from the other components of the system and replaced with a different storage engine. The modularized design also makes scaling out of each component much easier.

An HTAP system, such as the improved HTAP system described above, may be utilized by a variety of different systems or entities. FIG. 1 illustrates an example system 100 that includes an HTAP system. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide service(s) via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a service 112. The service 112 may comprise a content streaming service, such as an Internet protocol video streaming service. The service 112 may be configured to distribute content via a variety of transmission techniques. The service 112 is configured to provide the content, such as video, audio, textual data, a combination thereof, and/or the like. The content may comprise content streams (e.g., video stream, audio stream, information stream), content files (e.g., video file, audio file, text file), and/or other data. The content may be stored in a database. For example, the service 112 may comprise a video sharing service, a video hosting platform, a content distribution platform, a collaborative gaming platform, and/or the like. The service 112 may comprise any other type of service in addition to, or instead of, a content streaming service.

In an embodiment, the service 112 may be provided to the client devices 104 via the network 120. If the service 112 is a content streaming service, content may be output to different client devices 104 via the network 120. The content may be streamed to the client devices 104. The content stream may be a stream of short videos received from the service 112. The plurality of client devices 104 may be configured to access the content from the service 112. In an embodiment, a client device 104 may comprise an application. The application outputs (e.g., display, render, present) the content to a user associated with the client device 104. The content may comprise videos, audio, comments, textual data and/or the like.

In an embodiment, a user may use the application on a client device 104 to create content and upload the short video to the cloud network 102. The client devices 104 may access an interface of the application. The interface may comprise an input element. For example, the input element may be configured to allow users to create the content. To create the content, the user may give the application permission to access an image capture device, such as a camera, or a microphone of the client device 104. After the user has created the content, the user may use the application to upload the content to the cloud network 102 and/or to save the content locally to the user device 104. The service 112 may store the uploaded content and any metadata associated with the content in one or more databases.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The plurality of computing nodes 118 may process tasks associated with the service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the service 112 comprises an HTAP system 110. The HTAP system 110 may comprise a plurality of different components (e.g., subsystems). For example, the HTAP system 110 may comprise one or more of a transactional OLTP engine, an analytic OLAP engine, an underlying decoupled storage, a metadata service, and/or a smart proxy.

The HTAP system 110 may have an architecture that supports heterogeneous query engines. The architecture may have the capability to handle both transactional OLTP workloads and complex analytic (OLAP) workloads. The architecture may follow a modularized design and its major components may be fully decoupled, providing flexibility and easy scaling out. For example, the components of the HTAP system 110 may be easily changed to similar established subsystems. The architecture may eliminate the interference between OLTP and OLAP workloads by having separate query processing engines and with different data copies.

The HTAP system 110 may keep user data in different formats for the OLTP engine and the OLAP engine. For example, the HTAP system 110 may, in a storage subsystem, keep user data in row format for the OLTP engine and columnar format for the OLAP engine for efficient query processing. The architecture may have a single point truth of metadata and may use a standalone metadata service to provide the latest metadata to certain components of the HTAP system 110. The architecture of the HTAP system 110 may include a smart proxy that dispatches queries to the OLTP and OLAP subsystems based on the nature of the queries (and therefore can hide the internal details to the users/clients). Users/clients may be able to utilize the HTAP system 110 with a single unified interface. For example, users/clients may be able to utilize the HTAP system 110 with an interface of a client device 104. The architecture may support various kinds of APIs (e.g., ANSI SQL, JDBC, ODBC, etc.) based on user requirements.

The architecture of the HTAP system 110 may be able to handle a large scale of data. This is a result of the fact that the compute and storage components in the HTAP system 110 may be decoupled. A decouplable storage system that is able to persist large amounts of data is utilized, as it is not assumed that data will be able to fit in memory. Computation resources and storage resources in the HTAP system 110 may also be scaled out and are therefore capable of handling large amounts of data and large scale (OLTP and OLAP) workloads with flexibility.

The architecture of the HTAP system 110 may be capable of effective and real-time data processing. DML queries may be handled effectively by the OLTP engine and effectively written to the underlying storage in row format. The architecture of the HTAP system 110 may include a OLAP query engine that has the ability of distributed query processing (high parallelism, better resource utilization) to effectively handle complex OLAP queries, including joins, aggregates, etc. Effective and real-time processing is empowered by the fact that interference between OLTP and OLAP workloads is minimized, as the architecture of the HTAP system 110 facilities the storage of distinct copies of data on both the OLTP and OLAP sides. The OLTP and OLAP data formats may be separately optimized to fit their workloads. There may be a single source of data change through the HTAP system 110 (from the OLTP side), simplifying the consistency model and concurrency handling across the OLTP and OLAP components.

The architecture of the HTAP system 110 may provide fresh/real-time data changes for OLAP queries. Logical logs of DMLs may be immediately propagated from the OLTP component to the OLAP component upon commit. These logs may be dispatched to distributed partitions and may be continuously applied to in-memory Delta Stores via in-memory operations, which are usually very fast. Data changes carried by logical logs may be immediately available for OLAP queries upon being applied to in-memory Delta Stores. A unified version control across the HTAP system 110 is utilized by the architecture of the HTAP system 110 so that strong data consistency is guaranteed. The OLTP component of the HTAP system 110 may support snapshot isolation and other (weaker) consistency models as most of transactional OLTP database engines.

Figure 2:
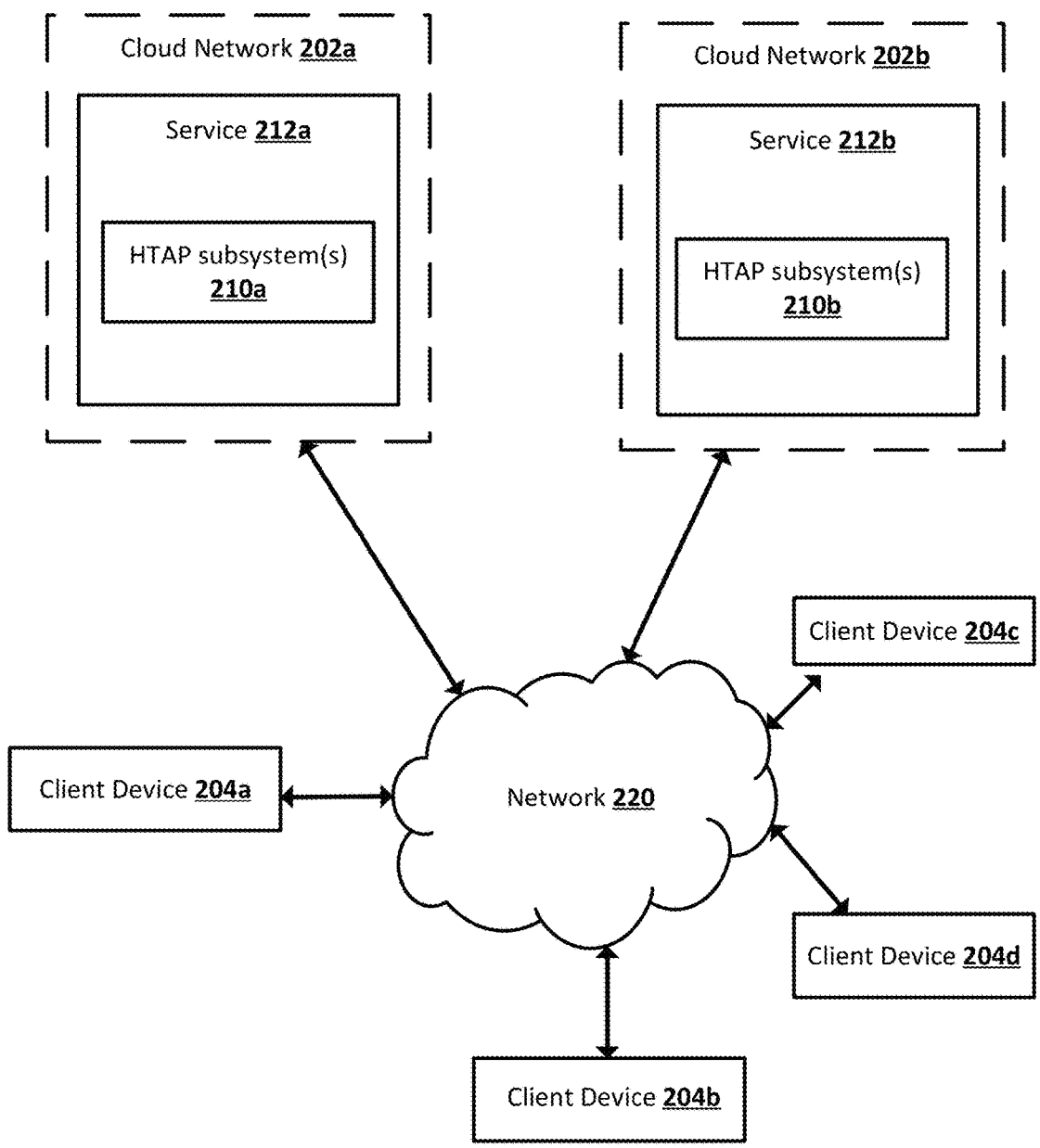
FIG. 2 shows an example system including more than one cloud service.

While the system 100 of FIG. 1 illustrates the HTAP system 110 as being provided by a single cloud network 102, the various components/subsystems of the HTAP system 110 may instead be provided by a plurality of different cloud networks. FIG. 2 illustrates an example system 200 that includes an HTAP system having components/subsystems across a plurality of cloud networks. The system 200 may comprise cloud networks 202a-b and a plurality of client devices 204a-d. The cloud networks 202a-b and the plurality of client devices 204a-d may communicate with each other via one or more networks 220.

Each of the cloud networks 202a-b may resemble the cloud network 102 described above in FIG. 1. Each of the cloud networks 202a-b may be located at a data center, such as a single premise, or be distributed throughout different geographic locations (e.g., at several premises). The cloud networks 202a-b may provide service(s) via the one or more networks 220. The cloud networks 202a-b comprise a variety of network devices, such as routers, switches, multiplexers, hubs, modems, bridges, repeaters, firewalls, proxy devices, and/or the like. The cloud networks 202a-b may comprise physical links, such as coaxial cable links, twisted pair cable links, fiber optic links, a combination thereof, and/or the like. The cloud networks 202a-b may comprise wireless links, such as cellular links, satellite links, Wi-Fi links and/or the like.

Each of the cloud networks 202a-b may comprise a plurality of computing nodes that host a variety of services. In an embodiment, the nodes associated with the cloud network 202a host a service 212a and the nodes associated with the cloud network 202b host a service 212b. The services 212a-b may comprise any type of service, such as the content streaming service described above with respect to FIG. 1.

The plurality of client devices 204 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access at least one of the cloud networks 202a-b. The plurality of client devices 104 may travel to a variety of locations and use different networks to access the cloud networks 202a-b.

In an embodiment, each of the services 212a-b comprise one or more components/subsystems of an HTAP system (e.g., the HTAP system 110). The HTAP system 110 may comprise a plurality of different components (e.g., subsystems). For example, the HTAP system may comprise one or more of a transactional OLTP engine, an analytic OLAP engine, an underlying decoupled storage, a metadata service, and/or a smart proxy. The service 212a may comprise one or more of (but not all of) the components of the HTAP system. The service 212b may comprise the remainder of the components of the HTAP system. While two cloud networks and their respective services are shown in FIG. 2, it should be appreciated that any number of cloud networks/services may be utilized to implement the herein described HTAP system.

Figure 3:
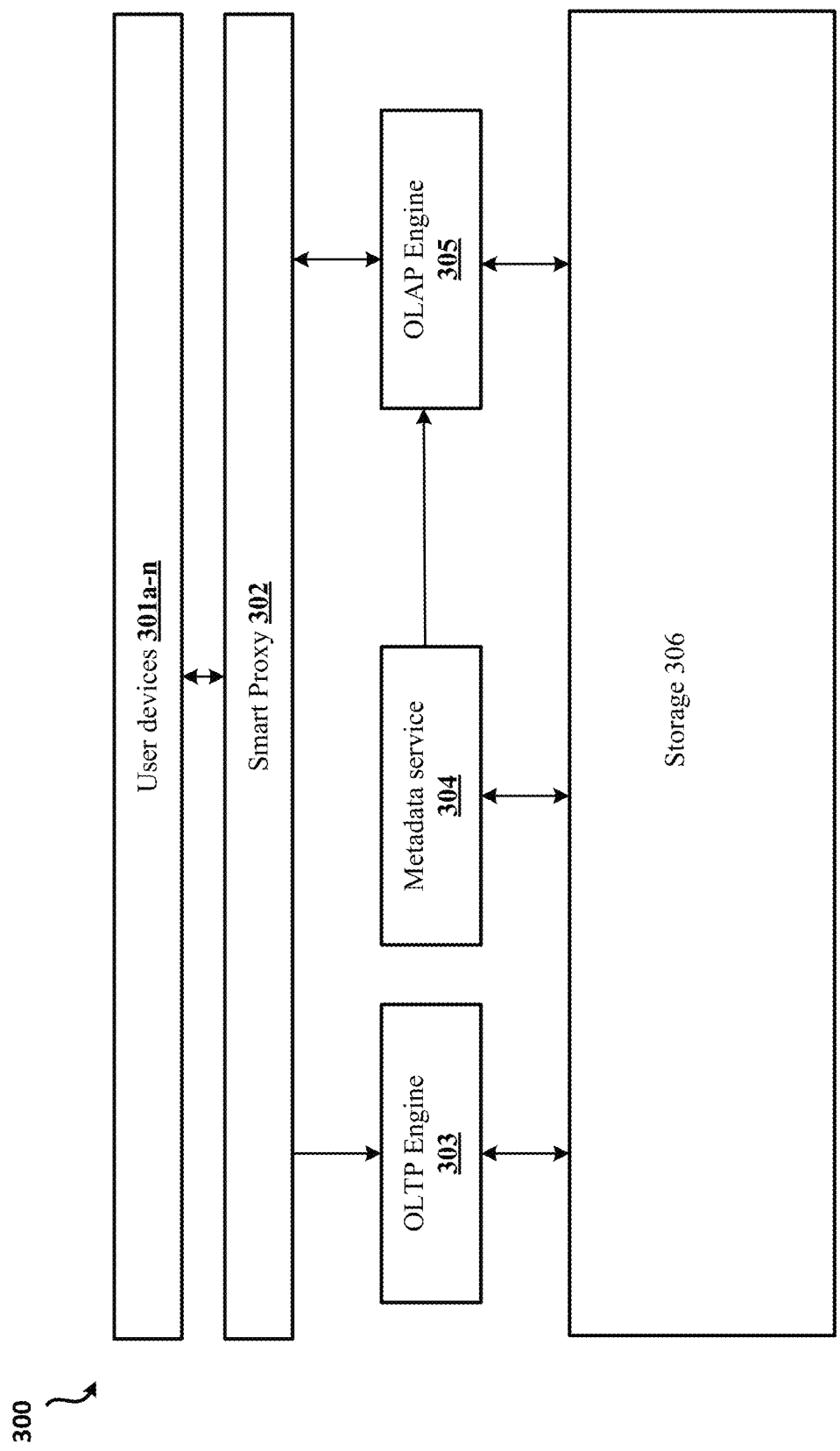
FIG. 3 shows an example system for hybrid transactional and analytical processing.

FIG. 3 shows an exemplary architecture 300 for a HTAP system (e.g., HTAP system 110) in accordance with the present disclosure. The architecture 300 comprises a plurality of different components (e.g., subsystems). The subsystems include an OLTP engine 303, an OLAP engine 305, a data storage system 306, a metadata service 304, and/or a proxy 302.

The OLTP engine 303 may receive user data, such as from the user devices 301a-n. The OLTP engine 303 may utilize a model that separates the compute engine from the underlying shared/cloud storage. The OLTP engine 303 may provide functionalities such as ACID transactional support, row storage, write-ahead logs (WAL) and log replication. The OLTP engine 303, for example, may capture the user data in real-time or near real-time. The OLTP engine 303 may comprise a data warehouse. The data warehouse may store the data captured by the OLTP engine 303.

The OLTP engine 303 may be configured to process at least some of the received user data in a particular format (e.g., row-based format). For example, upon receiving an OLTP query, the OLTP engine 303 may be configured to process at least some of the received user data in response to the query. An OLTP query may include, by way of example and without limitation, a query to retrieve a particular data item, query to filter the received data to look for a particular data item/description of a data item, and/or a query to filter the received data to identify a particular subset of the received data. For example, the queries may be DML queries and/or point look up queries.

The OLTP engine 303 may be configured to be coupled to and/or decoupled from the larger HTAP system 300. If the OLTP engine 303 is decoupled from the larger HTAP system 400, the OLTP engine 303 may be replaced with a substitute OLTP engine (e.g., a similar established OLTP engine). For example, the OLTP engine 303 may be MySQL, but it can be easily swapped to any other established OLTP engine, such as PostgreSQL.

The user devices 301a-n may comprise any type of computing device, such as a mobile device, a tablet device, laptop, a desktop computer, a smart television, or other smart device (e.g., smart watch, smart speaker, smart glasses, smart helmet), a gaming device, a set top box, digital streaming device, robot, and/or the like. The user devices 301a-n may be associated with one or more users. A single user may use one or more of the user devices 401a-n to access a cloud network that comprises the OLTP engine 303. The user devices 301a-n may travel to a variety of locations and use different networks to access the cloud network comprising the OLTP engine 303.

The OLAP engine 305 may access data captured by an OLTP engine, such as the OLTP engine 303. The data accessed by the OLAP engine 405 may be in a particular format (e.g., a hybrid row+column format) that is readable by the OLAP engine 305. The OLAP engine 305 may perform analysis on at least one portion of the data in the particular format in response to receiving an OLAP query.

For example, the OLAP engine 305 may perform an analytical operation on at least one portion of the data. OLAP consists of three basic analytical operations: consolidation (roll-up), drill-down, and slicing and dicing. Consolidation involves the aggregation of data that can be accumulated and computed in one or more dimensions. For example, all sales offices are rolled up to the sales department or sales division to anticipate sales trends. By contrast, the drill-down is a technique that allows users to navigate through the details. For instance, users can view the sales by individual products that make up a region's sales. Slicing and dicing is a feature whereby users can take out (slicing) a specific set of data of the OLAP cube and view (dicing) the slices from different viewpoints. These viewpoints are sometimes called dimensions (such as looking at the same sales by salesperson, or by date, or by customer, or by product, or by region, etc.). The results of the processing may be sent or forwarded to client devices 301a-n.

The OLAP engine 305 may be any OLAP engine that is capable of handling complex analytic queries effectively, such as an established open-source query engine (e.g., FlinkSQL). The OLAP engine 305 may be configured to be coupled to and/or decoupled from the larger HTAP system 300. If the OLAP engine 305 is decoupled from the larger HTAP system 300, the OLAP engine 305 may be replaced with a substitute OLAP engine (e.g., a similar established OLAP engine). For example, the OLAP engine 305 may be FlinkSQL, but it can be easily swapped to any other established OLAP engine, such as Presto or Spark SQL.

The storage subsystem 306 may be decoupled from the OLTP engine 303 and the OLAP engine 305. The data storage system 306 may persist user data in one format (e.g., row format) to be consumed by an OLTP engine, such as the OLTP engine 303, while persisting the same user data in a different format (e.g., hybrid row+column format) to be consumed by an OLAP engine, such as the OLAP engine 305. This may significantly reduce the interference between the OLAP and OLTP workloads. The storage subsystem 306 may be configured to be coupled to and/or decoupled from the larger HTAP system 300 as shown FIG. 3. If the storage subsystem 306 is decoupled from the larger HTAP system 300, the storage subsystem 306 may be replaced with a substitute storage subsystem (e.g., a similar established storage subsystem). The architecture of the storage subsystem 306 is discussed in more detail below with regard to FIG. 4.

The metadata service 304 may be configured to align the metadata of the OLTP engine 303 and the OLAP engine 305. The metadata service 404 may extract metadata from events (e.g., DDLs) generated by certain resources (e.g., user input through the OLTP engine 303), generate metadata versions and align them with the order of DMLs, make them globally available and persist them. The metadata service 304 may generate replicas of the metadata versions for high availability. The metadata service 304 may extract metadata from DDLs received by the OLTP engine (with versions aligned by the same LSN system used for DMLs), persisted into a dedicated database and pushed to/pulled by FlinkSQL and AP storage servers.

The metadata service 304 may be configured to be coupled to and/or decoupled from the larger HTAP system 300. If the metadata service 304 is decoupled from the larger HTAP system 300, the metadata service 304 may be replaced with a substitute metadata service (e.g., a similar established metadata service).

The proxy 302 may be configured to connect user devices 301a-n to the OLTP engine 303 and/or the OLAP engine 305 though a common proxy layer. The proxy 302 may be a smart proxy. The proxy 302 may provide a single unified API (default: ANSL SQL plus some common OLAP extensions) to users/clients, i.e., the underlying system details are transparent to the clients if they connected through the proxy. Various kinds of APIs (e.g., ANSI SQL, JDBC, ODBC, etc.) may be utilized, based on user requirements.

Utilizing a single unified API may reduce user efforts in using the system. DMLs/bulk loading and queries both operate against entire the HTAP system 300 since the OLTP engine 303 and OLAP engine 305 each maintain a whole copy of data. The proxy 302 may have the ability to automatically dispatch different client requests/queries to different engines (e.g., the OLTP engine 303 or the OLAP engine 305) based on the nature of the request. For example, a complex OLAP query will be directed to the OLAP engine 305, while DMLs, DDLs and point-lookups queries will be directed to the OLTP engine 303.

The proxy 302 may be configured to be coupled to and/or decoupled from the larger HTAP system 300. If the proxy 302 is decoupled from the larger HTAP system 300, the proxy 302 may be replaced with a substitute common proxy (e.g., a similar established proxy).

Figure 4:
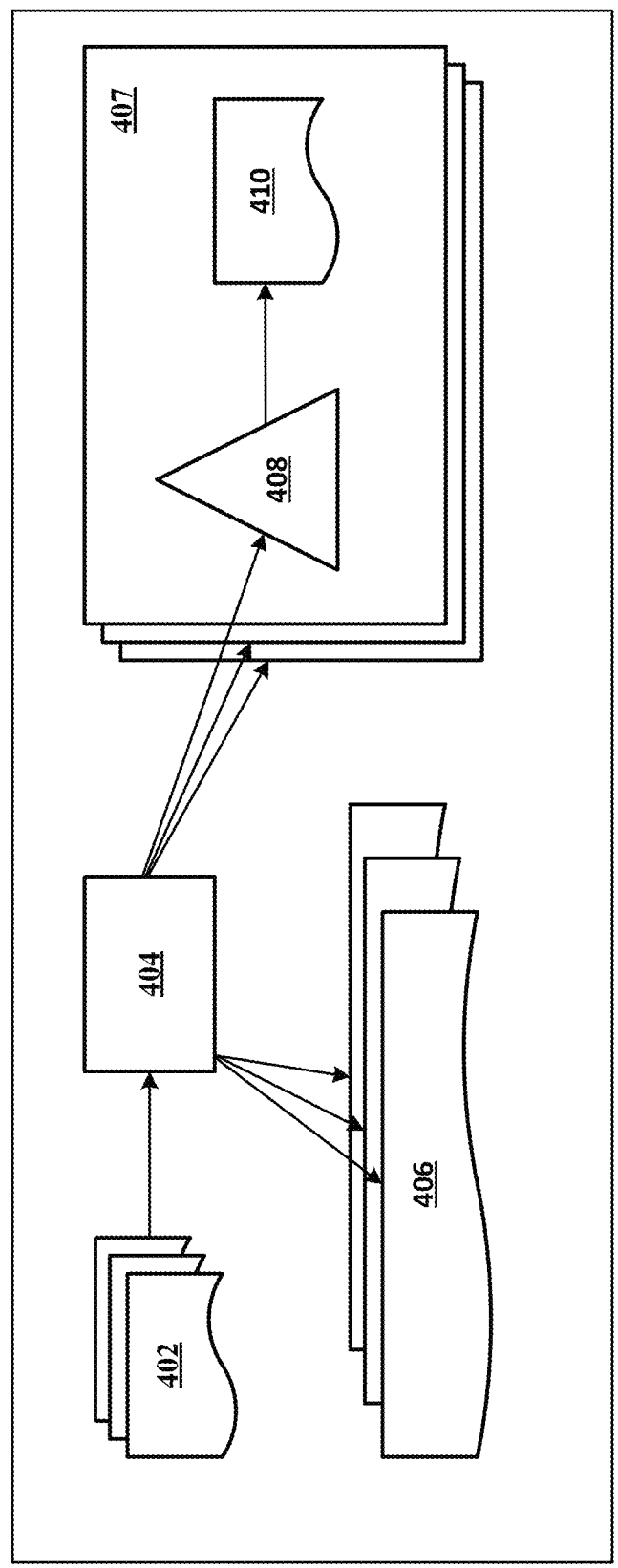
FIG. 4 shows an example storage engine for hybrid transactional and analytical processing.

An HTAP system (e.g., HTAP system 110) may comprise a data storage component. FIG. 4 shows the storage system 306 of FIG. 3 in more detail. In the data storage system 306, high data freshness is achieved through the design of a distributed in-memory Delta Store with multiple replicas and an efficient log distributor applying quorum protocol on multiple replicas.

The data storage system 306 may persist user data in one format (e.g., row format) to be consumed by an OLTP engine, while persisting the same user data in a different format (e.g., hybrid row+column format) to be consumed by an OLAP engine. This may significantly reduce the interference between the OLAP and OLTP workloads. A plurality of data replicas (e.g., three data replicas) may be kept for both formats of data for high availability.

The data storage system 306 may function as a unified storage layer. However, the architecture of the data storage system 306, may be divided into two parts: the TP part and the AP part. Transactional DML and DDL received by the OLTP engine may be presented as physical/redo logs (with the information of underlying storage) and logical logs in a log store 402. These logs may be persisted in the TP part of the storage. An exemplary logical log is discussed below in more detail with regard to FIG. 5.

The physical logs may then be replicated and distributed by a log distributor 404 to other storages and replayed to construct data pages. For example, the log distributor 404 may distributes write-ahead-logs (WAL) to a row store 406 in the shared storage. Data in the pages may be organized in row format and stored in the row data store 406. The data stored in the row data store 406 may be used by the OLTP engine for simple queries including point-lookup queries.

The logical logs may also be replicated and distributed by the log distributor 404 to the AP part of the storage, such as to each partition 407. Each user table in the AP part of storage may be partitioned based on partitioning scheme defined on table creation. Each partition 407 may be resident in a physical storage node (e.g., server) and several replicas of the data may be maintained in each partition for high availability. Each partition 407 may be further divided into an in-memory Delta Store 408 and an on-disk Base Store 410. Logical logs (such as My SQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates.

Logical logs arrived at each AP storage nodes may be sorted, persisted, and then applied in order into the in-memory Delta Store 408 of each partition 407. Logical logs may be applied in order into in-memory Delta Stores 408 once they arrive. The delay between the time that data changes inside the OLTP engine and the time that the data changes appear inside the Delta Stores 408 may be almost nonexistent (e.g., less than a few hundred milli-seconds in most cases). Delta Store 408 may store data in row format that is ordered by their log serial number (LSN, a serial number/version that indicates the order of the data operations). Data inside Delta Store 408 may be flushed to Base Store 410 in regular bases, for example, when its size grows over some predefined threshold or after some fixed time interval. After the flush, memory occupied by the flushed data may be garbage collected.

Data in Base Store 410 may be organized in columnar format for better performance of analytic workloads and persisted/stored in local file systems. Each partition 407 may be stored in a separate directory, and data for different columns may be stored in different files. In each data file, data is sorted by the primary key (one or multiple columns). In addition, data blocks may be periodically merged with a groom procedure in a background task.

Data in Base Store 410 may not be able to be updated in-place, so a delete bitmap that marks the rows that are deleted may be maintained. A key-value (KV) system may be used to store delete bitmaps that contain information about rows that are removed from the Base Store 410 after the flush from the Delta Store 408 since data blocks are not modified once they are generated.

With more and more deletions and overlapping flushed data units, compacting, and rearranging the data inside may benefit storage and potentially query performance, thus AP data units and clean up redundant data may be compacted on a regular basis. Files in Base Store 410 may be versioned, which is the largest LSNs in a file when it is flushed. LSNs may not be kept in the Base Store 410, which may result in all files in the Base Store 410 having the same version (i.e., the last flush LSN). This may provide many advantages. For example, it may save storage space, make delete more efficient by using the delete bitmap, and make scan faster without the need to compare with LSNs. However, not keeping LSNs in the Base Store 410 may imply that users will not be able to query versions that are older than the latest flushed version from the Delta Store 408. In some embodiments, LSNs for the data may be kept in the Base Store 410 so that time travel queries are supported (with some cost on the storage and scan performance).

FIG. 5 illustrates an exemplary logical log 500. To keep a history of transactions and database server changes since the time of the last storage-space backup, a database server may generate log records. The database server may store the log records in the logical log, a circular file that is composed of three or more logical-log files. The log is called logical because the log records represent logical operations of the database server, as opposed to physical operations.

As discussed above, transactional DML and DDL received by the OLTP engine may be presented as physical/redo logs (with the information of underlying storage) and logical logs, such as the logical log 500, in a log store (e.g., log store 302). The logical log 500 comprises, amongst other data, data indicative of partition key, table, data indicative of one or more operations, and data indicative of a primary key. For example, in the column 502, data indicative of partition keys is stored. In the column 504, data indicative of table is stored. In the column 506, data indicative of one or more operations is stored. In the column 506, data indicative of a primary key is stored. The one or more operations may include any operation, including but not limited to, delete, insert, or DDL.

The logical logs, such as the logical log 500, may be replicated and distributed by a log distributor (e.g., log distributor 404) to the AP part of the storage system (e.g., storage system 306), such as to each partition (e.g., partition(s) 407). Each user table in the AP part of storage may be partitioned based on partitioning scheme defined on table creation. Each partition may be resident in a physical storage node (e.g., server) and several replicas of the data may be maintained in each partition for high availability. Each partition may be further divided into an in-memory Delta Store (e.g., in-memory Delta Store 408) and an on-disk Base Store (e.g., on-disk Base Store 410). Logical logs (such as MySQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates. Logical logs, such as the logical log 500, that arrive at each AP storage node may be sorted, persisted, and then applied in order into the in-memory Delta Store of each partition.

Figure 6:
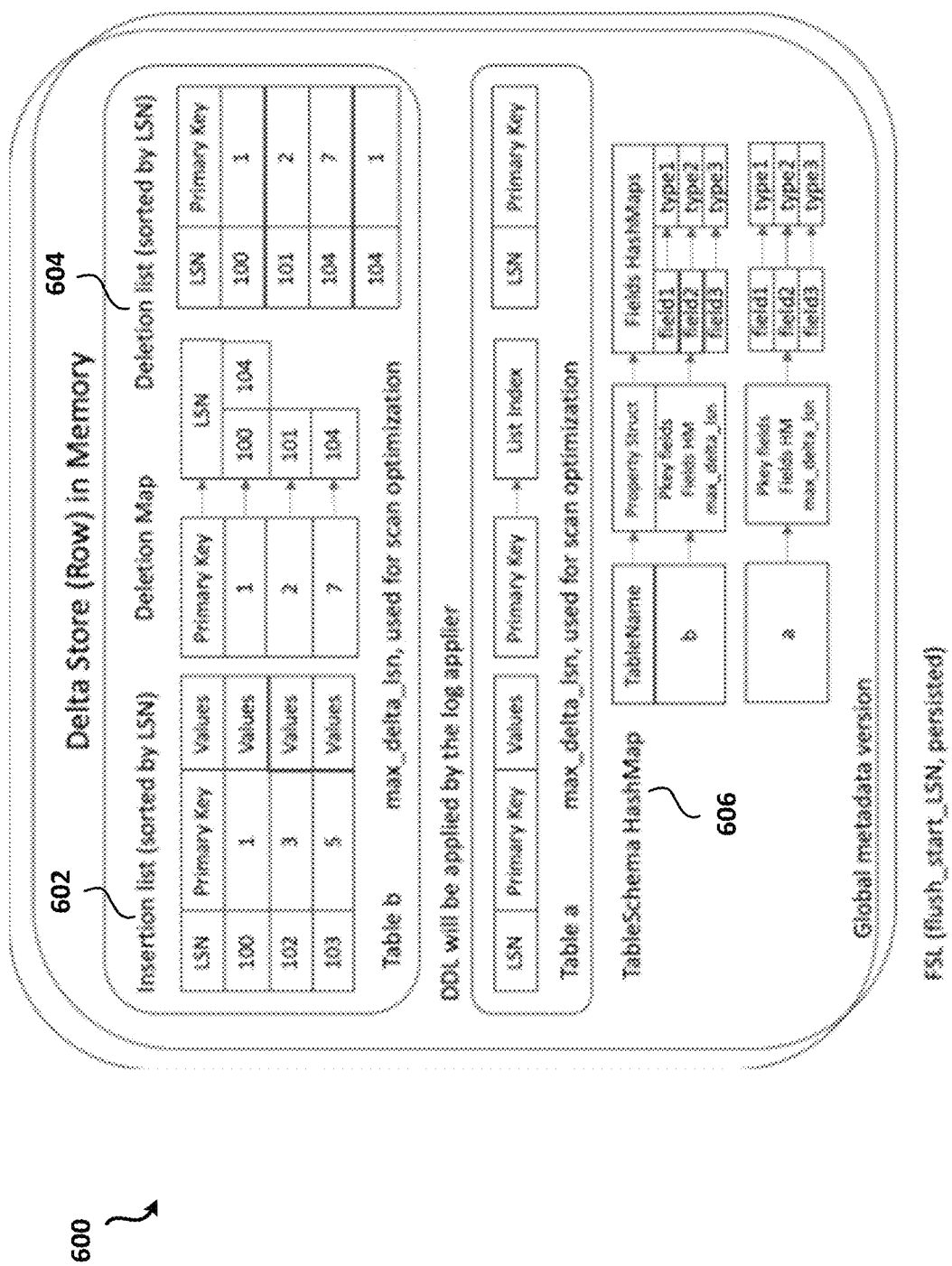
FIG. 6 shows an example data storage architecture of a Delta Store.

FIG. 6 illustrates an exemplary data structure 600 of a Delta Store. As discussed above, one in-memory Delta Store exists per table per partition. Each data structure 600 contains two separate delta lists sorted by LSN: an insertion delta list 602 and a deletion delta list 604. To speed up the search on the deletion delta list 604 (both the scan on the Base Store and the insertion delta list 602 need to check if a row is deleted by a delete in the deletion delta list 604), a hash map 606 is used (Primary Key, LSN list) on the deletion delta list 604 for fast lookup on deletes (O(1) cost for a delete check).

An update operation may be replaced by a delete operation followed by an insert operation, i.e., the row with the old data is deleted, and a row with the new data is inserted. This simplifies the HTAP storage engine to handle insert and delete only. The Delta Store data is generated solely from the log distributors. Each log distributor will apply logs to Delta Store in batches for efficiency and high data freshness. To process a logical log entry if it is an insert log, the log may be parsed into a tuple, and the tuple may be appended at the end of the insertion list. To process a logical log entry if it is a delete log, the log may be parsed into a tuple, the tuple of primary key may be appended at the end of the deletion list, and then the <Primary Key, LSN list> may be inserted into the deletion map.

Since the Delta Store is entirely in memory, the background flushing task will periodically flush rows to disk to make memory available. This can happen when enough rows are available (e.g., Number of rows >60K or the size of accumulated data exceeds 32 MB) and/or when enough long time is passed since last flush (e.g., 1 hour or any other predetermined time period). To not block query execution, flushed rows may be kept in the Delta Stores for a certain amount of time and those flushed rows will be truncated when all existing reads (including queries and background groom operation) have finished beyond the flush point.

As such, concurrent flush with query scan, groom and Garbage Collection (GC) operations over the Delta Store are allowed. To handle all partitions in a storage node, we can have multiple threads for the flushing in parallel on different partitions. Flush may be blocked by a long running query. We may kill such query, if a Delta Store grows too large and re-schedule the query to time slots when DMLs are rare. For the concurrent execution of LogApply, Flush, GC and Scan on a Delta Store, a safe solution may be to apply the read/write lock on the data structure of the Delta Store. The lock-free data structures and the atomic instruction of compare-and-swap (CAS) may also improve the concurrency.

To efficiently manage the Delta Store in memory, the vector of arenas may be utilized for the memory management of Delta Store. Each Delta Store initially has one arena with configurable starting size (for example, 4096 bytes). A new arena may be allocated with doubled size and added to the vector if the Delta Store uses up the memory in the current arena. Each arena is associated with an LSN that is the LSN of the last row saved in this arena. During the Delta Store GC, we release those arenas that are associated with an LSN that is smaller than the GC LSN.

The Delta Store is critical for the high data freshness in the HTAP system. The hash map 606 on deletes, flushing the row format data to column format, and the concurrency on the LogApply, flush and scan operations facilitate efficient analytic processing. Memory management using arena contributes to both the high data freshness and the efficient analytic processing.

Figure 7:
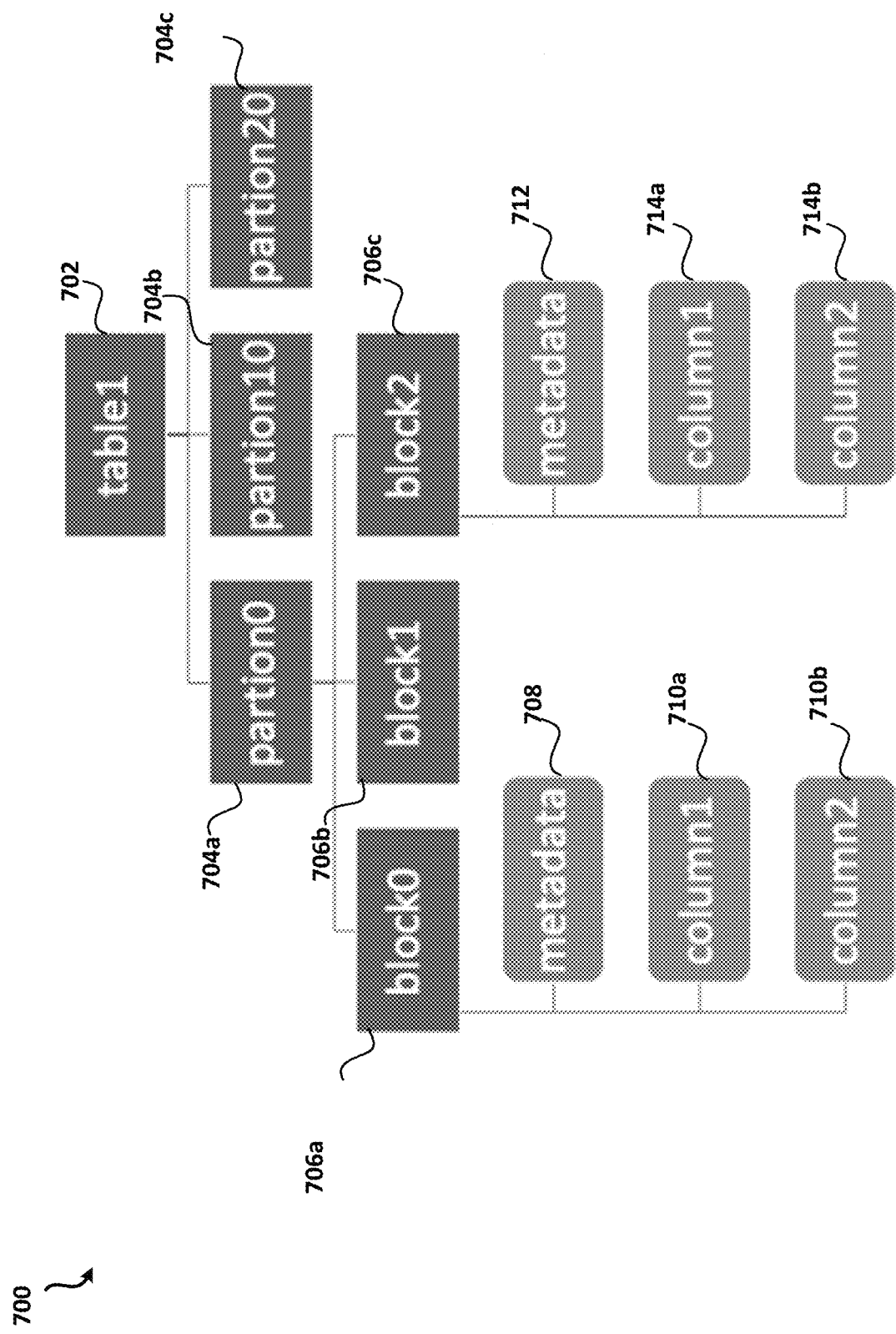
FIG. 7 shows an example data storage architecture of a Base Store.

FIG. 7 illustrates an exemplary data layout 700 of a table 702 in the Base Store. When data is flushed from the Delta Store to the Base Store, the data is stored in columnar format and partitioned into a plurality of partitions 704a-c based on partition keys for efficient querying OLAP workloads. Each HTAP storage node can contain multiple partitions, but each partition can only belong to one storage node. Base Store data is co-located with its associated Delta Store for efficient flush and scan operations. Data are stored in PAX format in the local file system of each storage node. Each table is partitioned by its partition keys, and each partition may have multiple data blocks 706a-c. In each data block, each column 710a-b, 714a-b is saved in a file, and there is a metadata file 708, 712 containing metadata of all columns for this data block. The metadata could have the number of rows in the data block, min/max/sum value and null bitmap of each column, etc. Data within each data block is ordered by the primary key.

A KV system may be used to store deleted bitmaps that contain information about rows that are removed from the Base Store after the flush from the Delta Store. This allows column store data files to be immutable once written to disk. The KV system provides a fast, reliable, and easy way to insert, and lookup deletes on a specific key or a range of keys, without using too much memory space. In an embodiment, one KV entry may be used to store a bitmap for each data block. In other embodiments, more than one KV entry may be used to store a bitmap for each data block. For each entry, we use the data block's block ID (more specifically, encoded primary key column file's logical id) as key, and the bitmap(bytes) as value.

Sample operations include, but are not limited to, insert deletes and scan with deletes. The insert deletes operation may search for block that has the delete key, using the block ID to fetch the bitmap. The delete key's ordinal offset may be searched in the block and the bitmap may be updated accordingly. The scan with deletes operation may perform a normal scan on each block based on an input key range and based on result data's offset range in the block. The bitmap segment may be fetched from the entire delete bitmap and applied on the result. To support efficient scan and data compression to reduce storage usage, the data in each column may be divided into data blocks 706a-c (compress units). Data in a data block may be compressed and saved in its column file. To efficiently search for the primary key, the bloom filter for the primary key may be used. If the primary key comprises multiple columns, there may be an extra column file to save the composite primary key for scan efficiency.

The columnar format of the Base Store with efficient data encoding and compression is facilitates efficient analytic processing. The design of delete bitmap is also critical both to the high data freshness and efficient analytic processing.

In an embodiment, to improve scan performance and reduce storage usage, a groom operation may be applied on Base Store in a background task. Since data blocks within a partition can have overlapped primary key ranges, a query may have to check many blocks, which can significantly slow down query processing. In addition, deleted rows in data files that are marked in the delete bitmap may be permanently deleted. This will not only reduce the size of the Base Store but also improve the efficiency of query processing. To achieve the above two goals, the Base Store performs a background Groom process to merge blocks within a partition. Groom operations on the Base Store improve the scan performance and reduce storage usage. The Groom operation does not block other operations such as LogApply, Flush, GC and Scan etc.

To have the Scan and Groom processes work in parallel, at the beginning of a scan (each scan is tagged with a read_LSN), the Base Store may generate/take a snapshot of all visible data blocks it reads, which may be the list of block IDs of these blocks. For the Groom operation, old blocks may be changed to invisible at the groom finish point and may also be tagged with allow_truncate_LSN, which is the maximum read_LSN of all active scans at the groom finish point (max_read_LSN). After all active scans with read_LSN<=allow_truncate_LSN finish, those old blocks in the GC thread may be removed.

The basic algorithm for the Groom process may comprise the following steps. At the groom start point, data blocks for grooming may be chosen based on a policy (e.g., delete bitmap, key overlap, data block size, IO budget etc.) Chosen data blocks may be merged and new data blocks (one or multiple) may be generated. The background merging does not block concurrent scans.

Next, metadata may need to be updated to make the newly merged blocks become visible (such as to the OLAP engine). This time may be referred to as the groom finish point. Metadata locking may be required for this operation. Scans started after the groom finish point may be able to see the new blocks from the updated metadata files. Since active scans need to be started before groom finish point can finish scanning the old data blocks, old data blocks may be prevented from being deleted before all these scans are done. Hence, old data blocks may be organized/stored in a deletion set with the tag (version) of current max_read_LSN at the groom finish point. Background GC may delete old data blocks in the deletion set if the tag(s) associated with the old data blocks are less than the current minimum read_LSN of all active scans.

To scan data in the storage engine, the HTAP system (having separated compute engine(s) and storage engine), utilizes a scan operation. The scan operation utilizes several optimizations on the scan of our HTAP storage engine, such as asynchronous RPC call, parallel scans using a scan thread pool, predicate pushdown, aggregate pushdown, cost-based optimization for deletes filtering, continuous scan for large data volume, and partition pruning etc. These techniques may each, alone or in combination, contribute to the efficient analytic processing.

The scan operation is through Remote Procedure Call (RPC) from the compute engine to scan the data in the storage engine. Multiple scan operations may be executed in parallel by threads in the scan thread pool. A table scan may be split and distributed to multiple parallel scans among the partitions of the table in the HTAP storage engine. The execution of a scan operation in a partition may be asynchronous and the call back function may be called to send back the results when the scan is done. The following may be the API of a scan operation: HTAP_Scan(scan_id, table_id, partition_id, predicate list, projection list, read_LSN, results, callback_function);

While scanning the data blocks in the HTAP storage, predicate filters and projection of required columns may be applied. If the query has an aggregate operator, its partial aggregation can be pushed down to the scan of the HTAP storage. The local partial aggregation in the storage node may greatly reduce the result data of the scan. The design of predicate and aggregate pushdown is critical to the performance of an HTAP system with separated compute and storage engine.

In addition, the delete bitmap may need to be checked to exclude deleted rows. The results of the Base Store scan may also need to exclude the deleted rows in the Delta Store by looking up the Delete HashMap based on a row's primary key. There are several suitable strategies to filter out the deleted data. One such strategy is to search the Delete HashMap for each scanned row of data. Another such strategy is to combine the delete bitmap and the deletions in the Delta Store for the scan of Base Store data. These two solutions have different cost for different workloads (for example, the number of deletes in the Delta Store and the data size of the Base Store may impact the cost). A cost-based optimization may be used to choose when to filter out the deletes in the Delta Store (if there are deletes in the Delta Store).

It is possible that a scan cannot be completed in one RPC call. For example, each RPC may have a row limit, and if the scan volume is large, the scan result has to be returned in batches. To handle this continuous scan requirement, the continuous scan framework may be configured to handle scan operations with a large data size in the compute and storage separated HTAP system. The storage engine may save scan state with an Iterator instance on a snapshot of the Delta Store and Base Store, and calling the nextBatch( )function to return next data batch. For example, the storage engine may keep a map of <Scan ID, Iterator instance>. When the compute engine launches a new scan request, the storage engine may assign a new scan ID, create iterator instance, and return the scan ID as part of the response. For continuous scan request, the storage engine may use the scan ID given by the compute engine to locate the current iterator instance and continue from there.

The optimizer of our OLAP engine can support partition pruning. Based on this optimization, our HTAP storage engine may only scan those partitions that are not pruned away by the optimizer. It may not improve the performance of a single query; however, it may improve the throughput and QPS (query per second) when multiple queries are running at the same time.

FIG. 8 illustrates an example process 800 that may be performed by a storage engine of a HTAP system, e.g., the storage subsystem 306 shown in FIG. 4. The storage engine may perform the process 800 to receive and/or organize user data in a manner that it able to be utilized by an OLTP subsystem and an OLAP subsystem. Although depicted as a sequence of operations in FIG. 8, those of ordinary skill in the art will appreciate that various embodiments may add, remove, reorder, or modify the depicted operations.

At 802, data captured by a first computing system (such as in real-time or near real-time) may be received. The first computing system may be, for example, an OLTP engine (e.g., OLTP engine 303). Since OLTP workloads inherently perform better with row-based data format and OLAP workloads prefer columnar data format, using one format for both workloads means that performance of the HTAP system is compromised.

To prevent this compromise of performance, user data may be stored in different formats for the OLTP engine and the OLAP engine. For example, user data may be kept in a first format (e.g., in row format) for the OLTP engine and a second format (e.g., a columnar format) for the OLAP engine for efficient query processing. The storage subsystem may comprise a plurality of partitions. Each partition may comprise a Delta Store and a corresponding Base Store. For example, each partition may be further divided into an in-memory Delta Store and an on-disk Base Store.

At 804, multiple replicas of logical logs generated based on the data may be distributed to a Delta Store by applying a quorum protocol on the multiple replicas. Delta Store may store data in row format that is ordered by their log serial number (LSN, a serial number/version that indicates the order of the data operations). Each user table may be partitioned based on partitioning scheme defined on table creation. Each partition may be resident in a physical storage node (e.g., server) and several replicas of the data may be maintained for high availability. Logical logs (such as MySQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates.

Logical logs arrived at each AP storage nodes may be sorted, persisted, and then applied in order into the in-memory Delta Store of each partition. The data in the Delta Store may be visible to a query for online analytical processing (OLAP) performed by a second processing engine. The multiple replicas of logical logs may be distributed, for example, by a log distributor (e.g., log distributor 404).

Data inside the Delta Store may be flushed to the corresponding Base Store. At 806, data may be flushed from the Delta Store to the corresponding Base Store based on one or more predetermined rules. For example, the data may be flushed from the Delta Store to the Base Store when its size (e.g., number of rows) grows over some predefined threshold and/or after some fixed time interval. Data in the Base Store may be stored in a columnar format and accessible by the OLAP engine. The data in the Base Store may be partitioned into a plurality of partitions based on partition keys. Each partition in the Base Store may comprise a plurality of data blocks, and data in each of the plurality of data block may be compressed. After the flush, memory occupied by the flushed data may be garbage collected.

Data in the Base Store may not be able to be updated in-place, so a delete bitmap that marks the rows that are deleted may be maintained. With more and more deletions and overlapping flushed data units, compacting, and rearranging the data inside may benefit storage and potentially query performance, thus AP data units and clean up redundant data may be compacted on a regular basis. Files in the Base Store may be versioned, which is the largest LSNs in a file when it is flushed. LSNs may not be kept in the Base Store, which may result in all files in the Base Store having the same version (i.e., the last flush LSN). This may provide many advantages. For example, it may save storage space, make delete more efficient by using the delete bitmap, and make scan faster without the need to compare with LSNs.

FIG. 9 illustrates an example process 900 that may be performed by a storage engine of a HTAP system, e.g., the storage subsystem 306 shown in FIG. 4. The storage engine of the HTA system may perform the process 900 to receive and/or organize user data in a manner that it able to be utilized by an OLTP subsystem and an OLAP subsystem. Although depicted as a sequence of operations in FIG. 9, those of ordinary skill in the art will appreciate that various embodiments may add, remove, reorder, or modify the depicted operations.

At 902, data captured by a first computing system (such as in real-time or near real-time) may be received. The first computing system may be, for example, an OLTP engine (e.g., OLTP engine 303). Since OLTP workloads inherently perform better with row-based data format and OLAP workloads prefer columnar data format, using one format for both workloads means that performance of the HTAP system is compromised.

To prevent this compromise of performance, user data may be stored in different formats for the OLTP engine and the OLAP engine. For example, user data may be kept in a first format (e.g., in row format) for the OLTP engine and a second format (e.g., a columnar format) for the OLAP engine for efficient query processing. The storage subsystem may comprise a plurality of partitions. Each partition may comprise a Delta Store and a corresponding Base Store. For example, each partition may be further divided into an in-memory Delta Store and an on-disk Base Store.

To prevent this compromise of performance, user data may be stored in different formats for the OLTP engine and the OLAP engine. For example, user data may be kept in a first format (e.g., in row format) for the OLTP engine and a second format (e.g., a columnar format) for the OLAP engine for efficient query processing. The storage subsystem may comprise a plurality of partitions. Each partition may comprise a Delta Store and a corresponding Base Store. For example, each partition may be further divided into an in-memory Delta Store and an on-disk Base Store.

At 904, multiple replicas of logical logs generated based on the data may be distributed to a Delta Store by applying a quorum protocol on the multiple replicas. Delta Store may store data in row format that is ordered by their log serial number (LSN, a serial number/version that indicates the order of the data operations). Each user table may be partitioned based on partitioning scheme defined on table creation. Each partition may be resident in a physical storage node (e.g., server) and several replicas of the data may be maintained for high availability. Logical logs (such as MySQL Binary Logs) for committed DML transactions may be continuously dispatched from the OLTP engine to user table partitions on each AP storage nodes. The data in the Delta Store may be visible to a query for online analytical processing (OLAP) performed by a second processing engine. The multiple replicas of logical logs may be distributed, for example, by a log distributor (e.g., log distributor 404).

At 906, the data in the Delta Store may be updated by performing a delete operation and an insert operation. For example, an update operation may be modeled with a delete operation followed by an insert operation. As a result, in the logical logs, there may be only inserts and deletes, but no updates.

To efficiently manage the Delta Store in memory, a vector of arenas may be utilized. At 908, the Delta Store may be managed using a vector of arenas. The vector may comprise an initial arena with a configurable starting size, and a new arena with a larger size may be added to the vector when the Delta Store uses up a memory in the initial arena. For example, each Delta Store initially has one arena with configurable starting size (for example, 4096 bytes). A new arena may be allocated with doubled size and added to the vector if the Delta Store uses up the memory in the current arena. Each arena is associated with an LSN that is the LSN of the last row saved in this arena. During the Delta Store GC, we release those arenas that are associated with an LSN that is smaller than the GC LSN.

Figure 10:
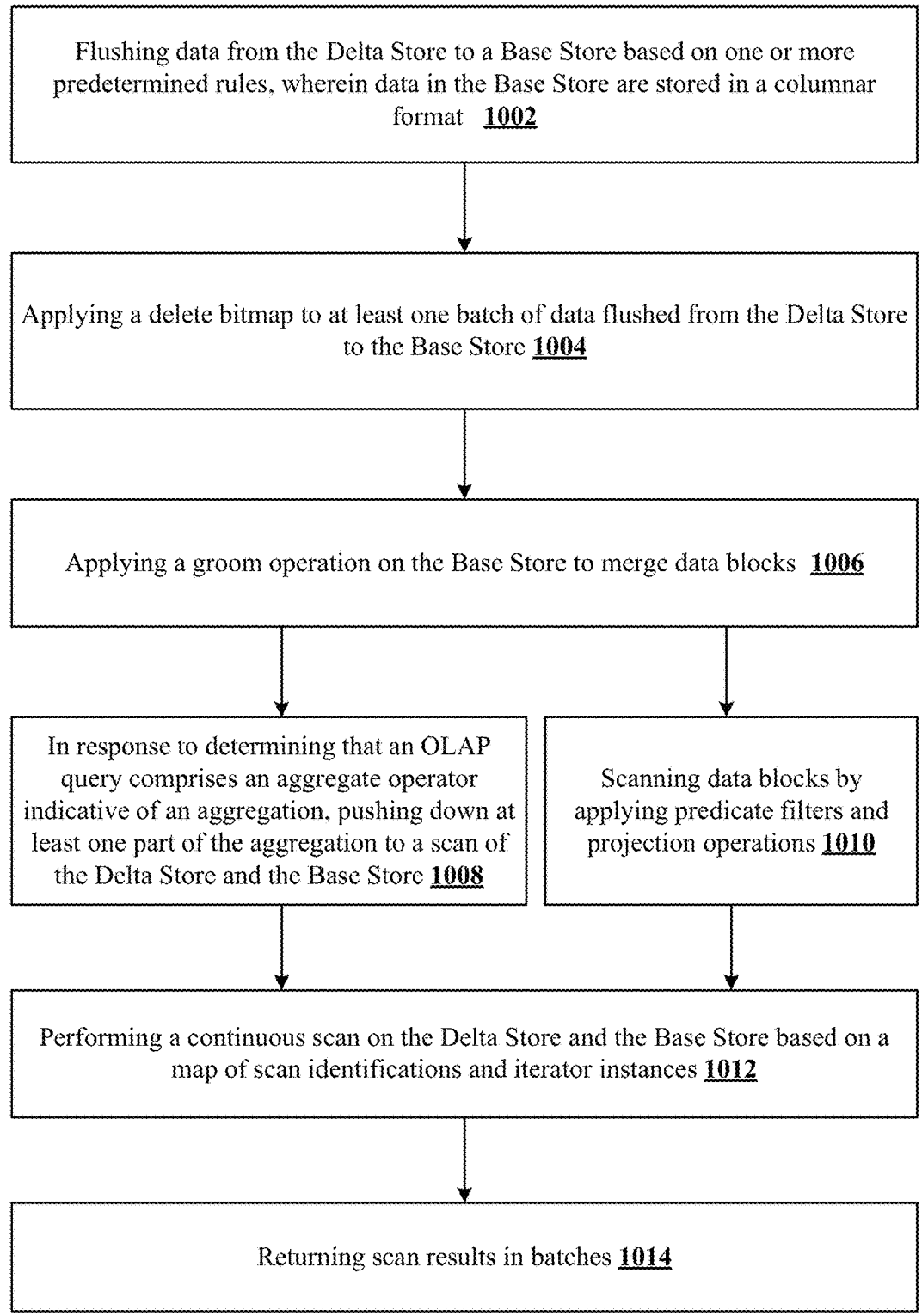
FIG. 10 shows an example process of a storage engine for hybrid transactional and analytical processing.

FIG. 10 illustrates an example process 1000 that may be performed by a storage engine of a HTAP system, e.g., the storage subsystem 306 shown in FIG. 4. The storage engine of the HTAP system may perform the process 1000 to receive and/or organize user data in a manner that it able to be utilized by an OLTP subsystem and an OLAP subsystem. Although depicted as a sequence of operations in FIG. 10, those of ordinary skill in the art will appreciate that various embodiments may add, remove, reorder, or modify the depicted operations.

As discussed above, logical logs may arrive at each AP storage nodes and may be sorted, persisted, and then applied in order into the in-memory Delta Store of each partition. Logical logs may be applied in order into in-memory Delta Stores once they arrive. The delay between the time that data changes inside the OLTP engine and the time that the data changes appear inside the Delta Stores may be almost nonexistent (e.g., less than a few hundred milli-seconds in most cases). Delta Store may store data in row format that is ordered by their log serial number (LSN, a serial number/version that indicates the order of the data operations).

At 1002, data may be flushed from the Delta Store to a Base Store based on one or more predetermined rules. Data inside the Delta Store may be flushed to the Base Store in regular bases, for example, when its size grows over some predefined threshold or after some fixed time interval. After the flush, memory occupied by the flushed data may be garbage collected. Data in the Base Store may be stored in a columnar format and may be accessible by the OLAP engine. Data in the Base Store may be organized in columnar format for better performance of analytic workloads and persisted/stored in local file systems. The data in the Base Store may be partitioned into a plurality of partitions based on partition keys. Each partition in the Base Store may comprise a plurality of data blocks.

Data in the Base Store may not be able to be updated in-place, so a delete bitmap that marks the rows that are deleted may be maintained. At 1004, a delete bitmap may be applied to at least one batch of data flushed from the Delta Store to the Base Store. A KV system may be used to store delete bitmaps that contain information about rows that are removed from the Base Store after the flush from the Delta Store, because data blocks are not modified once they are generated.

Each partition may be stored in a separate directory, and data for different columns may be stored in different files. In each data file, data is sorted by the primary key (one or multiple columns). In addition, data blocks may be periodically merged with a groom procedure in a background task. At 1006, a groom operation may be applied on the Base Store to merge data blocks in one of the plurality of partitions. Since data blocks within a partition can have overlapped primary key ranges, a query may have to check many blocks, which can significantly slow down query processing. In addition, deleted rows in data files that are marked in the delete bitmap may be permanently deleted. This will not only reduce the size of the Base Store but also improve the efficiency of query processing. To achieve the above two goals, the Base Store performs a background Groom process to merge blocks within a partition. Groom operations on the Base Store improve the scan performance and reduce storage usage. The Groom operation does not block other operations such as LogApply, Flush, GC and Scan etc.

To have the Scan and Groom processes work in parallel, at the beginning of a scan (each scan is tagged with a read_LSN), the Base Store may generate/take a snapshot of all visible data blocks it reads, which may be the list of block IDs of these blocks. For the Groom operation, old blocks may be changed to invisible at the groom finish point and may also be tagged with allow_truncate_LSN, which is the maximum read_LSN of all active scans at the groom finish point (max_read_LSN). After all active scans with read_LSN<=allow_truncate_LSN finish, those old blocks in the GC thread may be removed.

The basic algorithm for the Groom process may comprise the following steps. At the groom start point, data blocks for grooming may be chosen based on a policy (e.g., delete bitmap, key overlap, data block size, IO budget etc.) Chosen data blocks may be merged and new data blocks (one or multiple) may be generated. The background merging does not block concurrent scans.

Next, metadata may need to be updated to make the newly merged blocks become visible (such as to the OLAP engine). This time may be referred to as the groom finish point. Metadata locking may be required for this operation. Scans started after the groom finish point may be able to see the new blocks from the updated metadata files. Since active scans need to be started before groom finish point can finish scanning the old data blocks, old data blocks may be prevented from being deleted before all these scans are done. Hence, old data blocks may be organized/stored in a deletion set with the tag (version) of current max_read_LSN at the groom finish point. Background GC may delete old data blocks in the deletion set if the tag(s) associated with the old data blocks are less than the current minimum read_LSN of all active scans.

To scan data in the storage engine, the HTAP system (having separated compute engine(s) and storage engine), utilizes a scan operation. The scan operation utilizes several optimizations on the scan of our HTAP storage engine, such as asynchronous RPC call, parallel scans using a scan thread pool, predicate pushdown, aggregate pushdown, cost-based optimization for deletes filtering, continuous scan for large data volume, and partition pruning etc. These techniques may each, alone or in combination, contribute to the efficient analytic processing.

The scan operation is through Remote Procedure Call (RPC) from the compute engine to scan the data in the storage engine. Multiple scan operations may be executed in parallel by threads in the scan thread pool. A table scan may be split and distributed to multiple parallel scans among the partitions of the table in the HTAP storage engine. The execution of a scan operation in a partition may be asynchronous and the call back function may be called to send back the results when the scan is done. The following may be the API of a scan operation: HTAP_Scan(scan_id, table_id, partition_id, predicate list, projection list, read_LSN, results, callback_function);

While scanning the data blocks in the HTAP storage, predicate filters and projection of required columns may be applied. If the query has an aggregate operator, its partial aggregation can be pushed down to the scan of the HTAP storage. At 1008, in response to determining that an OLAP query comprises an aggregate operator indicative of an aggregation, at least one part of the aggregation may be pushed down to a scan of the Delta Store and the Base Store. The local partial aggregation in the storage node may greatly reduce the result data of the scan. The design of predicate and aggregate pushdown is critical to the performance of an HTAP system with separated compute and storage engine. At 1010, data blocks may be scanned by applying predicate filters and projection operations.

In addition, the delete bitmap may need to be checked to exclude deleted rows. The results of the Base Store scan may also need to exclude the deleted rows in the Delta Store by looking up the Delete HashMap based on a row's primary key. There are several suitable strategies to filter out the deleted data. One such strategy is to search the Delete HashMap for each scanned row of data. Another such strategy is to combine the delete bitmap and the deletions in the Delta Store for the scan of Base Store data. These two solutions have different cost for different workloads (for example, the number of deletes in the Delta Store and the data size of the Base Store may impact the cost). A cost-based optimization may be used to choose when to filter out the deletes in the Delta Store (if there are deletes in the Delta Store).

It is possible that a scan cannot be completed in one RPC call. For example, each RPC may have a row limit, and if the scan volume is large, the scan result has to be returned in batches. To handle this continuous scan requirement, a continuous scan framework may be configured to handle scan operations with a large data size in the compute and storage separated HTAP system.

At 1012, a continuous scan may be performed on the Delta Store and the Base Store based on a map of scan identifications and iterator instances. The storage engine may save scan state with an Iterator instance on a snapshot of the Delta Store and Base Store, and calling the nextBatch( )function to return next data batch. For example, the storage engine may keep a map of <Scan ID, Iterator instance>. When the compute engine launches a new scan request, the storage engine may assign a new scan ID, create iterator instance, and return the scan ID as part of the response. For continuous scan request, the storage engine may use the scan ID given by the compute engine to locate the current iterator instance and continue from there.

The optimizer of our OLAP engine can support partition pruning. Based on this optimization, our HTAP storage engine may only scan those partitions that are not pruned away by the optimizer. It may not improve the performance of a single query; however, it may improve the throughput and QPS (query per second) when multiple queries are running at the same time. At 1014, the scan result may be returned in one or more batches.

Figure 11:
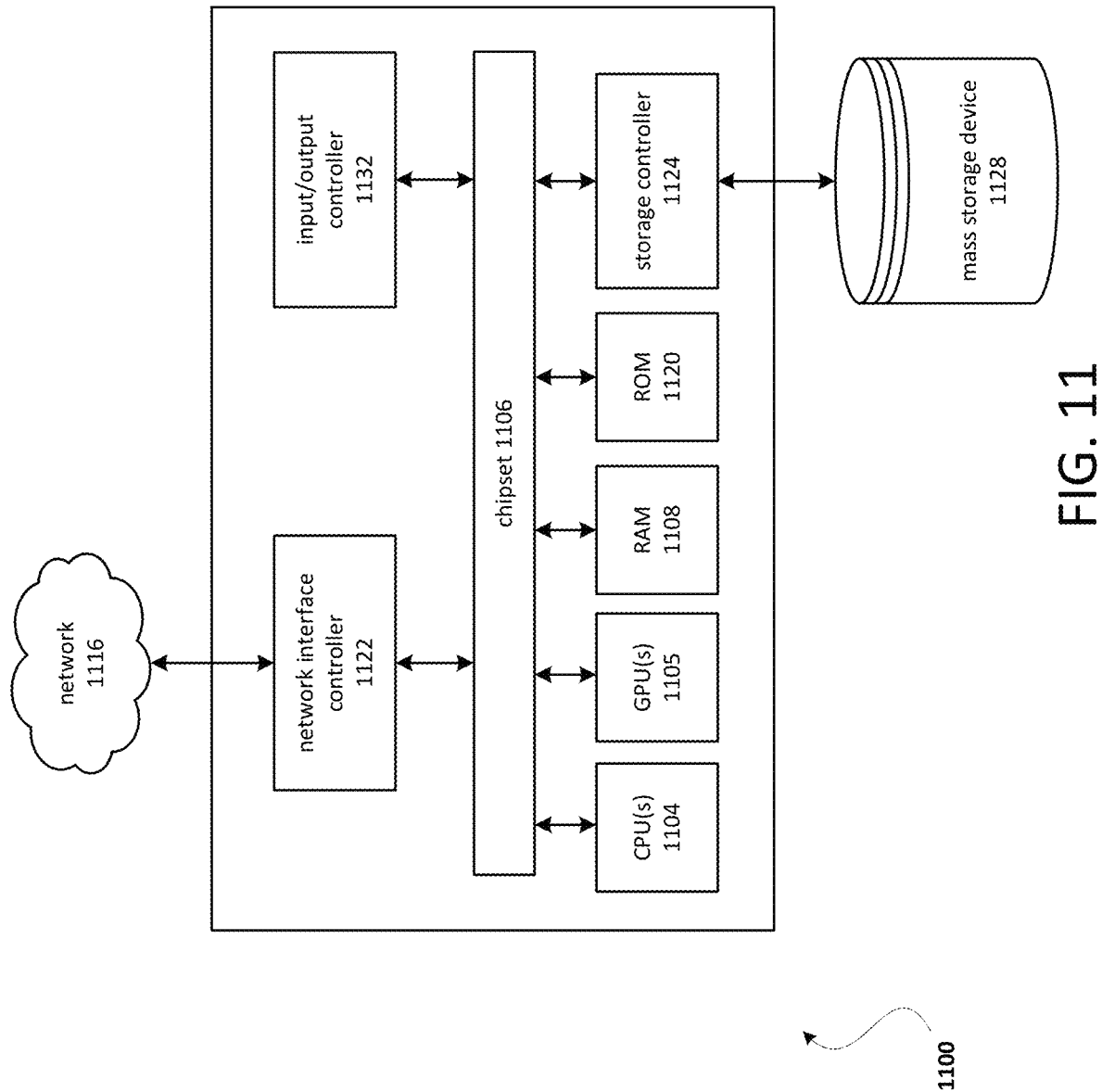
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, cloud network 102, the network 120, the client devices 104a-d, the service 102, the HTAP system 100, and/or the node 108 may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1111. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
receiving data captured by a first processing engine, wherein the first processing engine is configured to perform online transactional processing;
distributing multiple replicas of logical logs generated based on the data to a Delta Store in a storage system by applying a quorum protocol on the multiple replicas, wherein data in the Delta Store are stored in a row format and visible to a query for online analytical processing performed by a second processing engine;
flushing data from the Delta Store to a Base Store in the storage system based on one or more predetermined rules, wherein data in the Base Store are stored in a columnar format and accessible by the second processing engine, the data in the Base Store are partitioned into a plurality of partitions based on partition keys, and each partition in the Base Store comprises a plurality of data blocks;
wherein the storage system is configured to persist a same data in different formats to be consumed by the first processing engine and the second processing engine, respectively; and
wherein the storage system, the first processing engine, and the second processing engine are configured to be decoupled from each other.

2. The method of claim 1, further comprising:
updating the data in the Delta Store by performing a delete operation and an insert operation.

3. The method of claim 1, wherein the Delta Store comprises an insertion Delta list and a deletion Delta list, and the insertion Delta list and the deletion Delta list are sorted based on Log Sequential Numbers.

4. The method of claim 1, wherein each of the plurality of data blocks comprises a plurality of column files and a metadata file, and the metadata file comprises metadata associated with the plurality of column files.

5. The method of claim 1, further comprising:
applying a delete bitmap to at least one batch of data flushed from the Delta Store to the Base Store, wherein the delete bitmap comprises information indicative of rows that are removed after flushing from the Delta Store.

6. The method of claim 1, further comprising:
applying a groom operation on the Base Store to merge data blocks in one of the plurality of partitions.

7. The method of claim 1, further comprising:
scanning the plurality of data blocks by applying predicate filters and projection operations.

8. The method of claim 1, further comprising:
in response to determining that an online analytical processing query comprises an aggregate operator indicative of an aggregation, pushing down at least one part of the aggregation to a scan of the Delta Store and the Base Store.

9. The method of claim 1, further comprising:
performing a continuous scan on the Delta Store and the Base Store based on a map of scan identifications and iterator instances; and
returning scan results in batches.

10. A system, comprising:
at least one processor; and
at least one memory communicatively coupled to the at least one processor and comprising instructions that upon execution by the at least one processor cause the system to perform operations comprising:
receiving data captured by a first processing engine, wherein the first processing engine is configured to perform online transactional processing;
distributing multiple replicas of logical logs generated based on the data to a Delta Store in a storage system by applying a quorum protocol on the multiple replicas, wherein data in the Delta Store are stored in a row format and visible to a query for online analytical processing performed by a second processing engine;
flushing data from the Delta Store to a Base Store in the storage system based on one or more predetermined rules, wherein data in the Base Store are stored in a columnar format and accessible by the second processing engine, the data in the Base Store are partitioned into a plurality of partitions based on partition keys, and each partition in the Base Store comprises a plurality of data blocks;
wherein the storage system is configured to persist a same data in different formats to be consumed by the first processing engine and the second processing engine, respectively; and
wherein the storage system, the first processing engine, and the second processing engine are configured to be decoupled from each other.

11. The system of claim 10, the operations further comprising:
updating the data in the Delta Store by performing a delete operation and an insert operation.

12. The system of claim 10, wherein the Delta Store comprises an insertion Delta list and a deletion Delta list, and the insertion Delta list and the deletion Delta list are sorted based on Log Sequential Numbers (LSNs).

13. The system of claim 10, wherein each of the plurality of data blocks comprises a plurality of column files and a metadata file, and the metadata file comprises metadata associated with the plurality of column files.

14. The system of claim 10, the operations further comprising:
applying a delete bitmap to at least one batch of data flushed from the Delta Store to the Base Store, wherein the delete bitmap comprises information indicative of rows that are removed after flushing from the Delta Store.

15. The system of claim 10, the operations further comprising:
applying a groom operation on the Base Store to merge data blocks in one of the plurality of partitions.

16. The system of claim 10, the operations further comprising:
scanning the plurality of data blocks by applying predicate filters and projection operations.

17. The system of claim 10, the operations further comprising:
in response to determining that an online analytical processing query comprises an aggregate operator indicative of an aggregation, pushing down at least one part of the aggregation to a scan of the Delta Store and the Base Store.

18. The system of claim 10, the operations further comprising:
- performing a continuous scan on the Delta Store and the Base Store based on a map of scan identifications and iterator instances; and
- returning scan results in batches.

19. A non-transitory computer-readable storage medium, comprising computer-readable instructions that upon execution by a system cause the system to implement operations comprising:
- receiving data captured by a first processing engine, wherein the first processing engine is configured to perform online transactional processing;
- distributing multiple replicas of logical logs generated based on the data to a Delta Store in a storage system by applying a quorum protocol on the multiple replicas, wherein data in the Delta Store are stored in a row format and visible to a query for online analytical processing performed by a second processing engine;
- flushing data from the Delta Store to a Base Store in the storage system based on one or more predetermined rules, wherein data in the Base Store are stored in a columnar format and accessible by the second processing engine, the data in the Base Store are partitioned into a plurality of partitions based on partition keys, and each partition in the Base Store comprises a plurality of data blocks;
- wherein the storage system is configured to persist a same data in different formats to be consumed by the first processing engine and the second processing engine, respectively; and
- wherein the storage system, the first processing engine, and the second processing engine are configured to be decoupled from each other.

20. The non-transitory computer-readable storage medium of claim 19,
- wherein the Delta Store comprises an insertion Delta list and a deletion Delta list, and the insertion Delta list and the deletion Delta list are sorted based on Log Sequential Numbers; and
- wherein each of the plurality of data blocks comprises a plurality of column files and a metadata file, and the metadata file comprises metadata associated with the plurality of column files.

* * * * *